Figure 1:
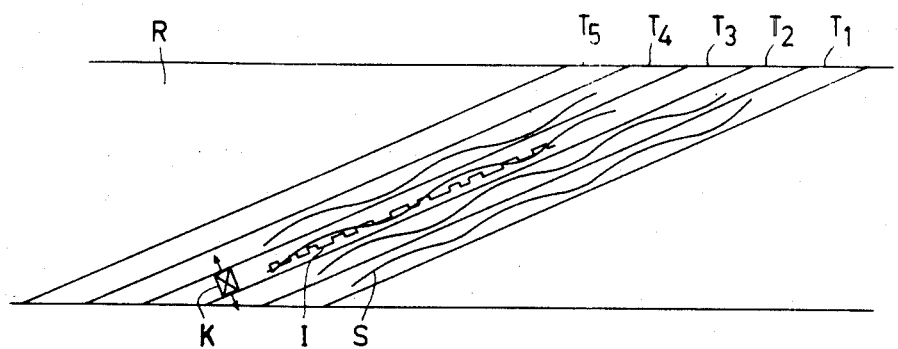

United States Patent [19]

de Niet

[11] Patent Number: 4,542,425
[45] Date of Patent: Sep. 17, 1985

[54] APPARATUS FOR READING A RECORD CARRIER

[75] Inventor: Edmond de Niet, Eindhoven, Netherlands

[73] Assignee: U.S. Philips Corporation, New York, N.Y.

[21] Appl. No.: 452,566

[22] Filed: Dec. 23, 1982

[30] Foreign Application Priority Data

Sep. 20, 1982 [NL] Netherlands .................. 8203618

[51] Int. Cl.$^4$ .............................................. G11B 5/58
[52] U.S. Cl. .................................................... 360/77
[58] Field of Search ...................... 360/65, 77; 369/43, 369/44

[56] References Cited

U.S. PATENT DOCUMENTS 4,464,714 8/1984 Huijser et al. ..................... 364/200

Primary Examiner—George G. Stellar
Attorney, Agent, or Firm—Robert T. Mayer

[57] ABSTRACT

The invention relates to apparatus for reading a record carrier on which digital information and tracking signals of comparatively low frequency have been recorded. The apparatus comprises a correction circuit to which the regenerated digital signal is applied, which correction circuit has a transfer characteristic which at least within the frequency band of the tracking signals corresponds to the transfer characteristic of the chain comprising the recording element, the record carrier and the read element. The correction signal supplied by the correction circuit is subtracted from the signal that is read and the tracking signals are derived from the signal thus obtained. In this way cross-talk components produced in the tracking signals by the digital signal are compensated for.

3 Claims, 3 Drawing Figures

APPARATUS FOR READING A RECORD CARRIER

The invention relates to apparatus for reading a record carrier which comprises information tracks which in addition to an information signal also contain tracking signals, which apparatus comprises a read element for reading information recorded in the information tracks, a signal-processing circuit for processing the information signal present in the information that is read and a servo control system for deriving an error signal from the tracking signals extracted from the information that is read, which error signal is representative of the position of the read element relative to the information track to be read in a direction transverse to the track direction, and for controlling the position of said read element relative to said information track in response to said error signal.

Such apparatus is known, for example from U.S. Pat. No. 4,297,733. The apparatus described in that patent is intended for reading a magnetic record carrier in the form of a tape on which a video signal is recorded in information tracks which are slightly inclined relative to the longitudinal direction of the tape and whch are consecutively scanned by a plurality of magnetic heads arranged on a rotary head disk. In order to ensure that the information tracks are scanned with a high accuracy each of the magnetic heads is mounted on a piezoelectric actuator, which is capable of changing the position of the magnetic head in a direction transverse to the track direction. In order to obtain a control signal for this piezo-electric actuator the information tracks contain tracking signals in addition to the video signals. In the system described in said U.S. Letters Patent these tracking signals comprise four signals of relatively low fixed frequencies which are consecutively recorded in four information tracks. If during scanning of a specific information track the cross-talk to the two adjacent information tracks is measured and these cross-talk components are compared with each other an error signal is obtained which represents the deviation of the magnetic head relative to the information track to be scanned and which may therefore be used as a control signal for the actuator.

The record carrier described in the foregoing may also be used for the storage of a digital information signal, for example digital video and/or audio information. However, it has been found that the tracking accuracy may then not be satisfactory, so that the read process may be disturbed even considerably.

The invention aims at providing apparatus of the type mentioned in the opening paragraph which ensures a high tracking accuracy when reading a digital information signal. To this end the invention is characterized in that for reading a record carrier on which a digital information signal has been recorded the signal-processing circuit is adapted to regenerate said digital information signal, the apparatus further comprises a correction circuit, which is coupled to said signal processing circuit, for receiving the regenerated digital information signal, and the servo control system comprises a compensation circuit, which is coupled to the output of the correction circuit, for reducing cross-talk components of the digital information signal in the tracking signals, said correction circuit having a transfer characteristic which at least within the frequency band of the tracking signals at least approximates the transfer characteristic of the chain comprising the recording element used for recording the information, the record carrier and the read element.

The invention is based on the recognition that in the case of a record carrier on which a digital information signal has been recorded this information signal may produce cross-talk components in the tracking signals. In contradistinction to the analogue information signal, whose frequency band is spaced distinctly from that of the tracking signals, a digital information signal has such a broad frequency spectrum that components may occur within the frequency band of the tracking signals. Obviously, these components affect the error signal obtained via the tracking signals and thus the accuracy of the servo control system.

This adverse effect is eliminated by the disclosed invention. The invention employs the fact that the information signal is a digital signal. It is known that during read-out of a record carrier digital information can be regenerated very accurately because in principle only the positions of the transitions between the logic levels should be restored, which restoration can be effected very accurately because the possible positions of these transitions are defined by a clock signal generated in the signal processing circuit. This insures that the digital information signal regenerated in the signal processing circuit is a highly accurate representation of the originally recorded information signal.

In accordance with the invention said regenerated digital information signal is applied to a correction circuit having a transfer characteristic which within the frequency band of the tracking signals at least substantially corresponds to the transfer characteristic of the chain comprising the recording element, the record carrier and the read element. This means that the output signal of said correction circuit, at least within the frequency band of the tracking signals, corresponds to the signal content within this frequency band, of the digital information signal that is read. Thus, if this output signal of the correction circuit is subtracted from the signal that is read only the tracking signals are left within this frequency band. Filtering out this frequency band then yields the tracking signals from which possible cross-talk components of the digital information signal have been eliminated, so that an accurate tracking signal for the servo control system can be derived from said signal.

According to the invention an apparatus for reading a magnetic record carrier is characterized in that the correction circuit has a transfer characteristic which at least substantially corresponds to the transfer characteristic of the read element. This embodiment is based on the recognition that a magnetic head has a virtually straight characteristic during recording, whilst the characteristic of a magnetic record carrier, at least within the limited frequency band of the tracking signals, is also substantially straight. Suitably, the correction circuit comprises a differentiator by means of which a satisfactory simulation of the characteristic of the magnetic read head can be obtained.

Figure 2:
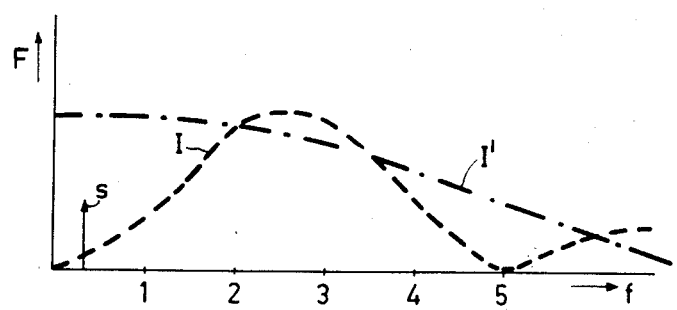

The invention will now be described in more detail, by way of example, with reference to the drawing, in which FIG. 1 schematically shows a magnetic tape and the signals recorded on this tape, and FIG. 2 shows the frequency spectrum of the recorded signals.

Figure 3:
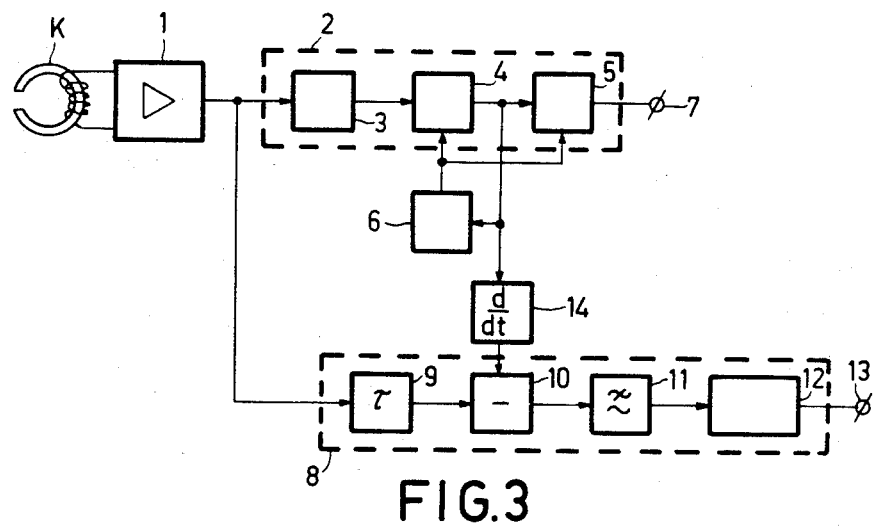

FIG. 3 is a block diagram of the apparatus in accordance with the invention.

FIG. 1 schematically shows a magnetic tape R on which information tracks $T_1$ to $T_5$ have been recorded, which information tracks are consecutively scanned by means of a plurality of magnetic heads K mounted on a rotating head disk. These information tracks contain a digital information signal as indicated by the squarewave I in track $T_3$. Moreover, these information tracks contain tracking signals indicated by the waveform S. When an information track, for example the track $T_3$, is read by means of head K the cross-talk signals produced by the tracking signals recorded in the two adjacent tracks $T_2$ and $T_4$ are read in addition to the signal recorded in tract $T_3$. From the relative magnitude of these two cross-talk signals an error signal is derived, which error signal represents the tracking error of the head K relative to track $T_3$. This error signal may then be used for controlling the position of head K relative to track $T_3$. For this purpose magnetic head K may be arranged on a piezo-electric actuator which is movable in a direction transverse to the track direction by means of a control signal derived from the error signal. Moreover, the generated error signal may be applied to the servo control loop which controls the tape speed. By using one or both of these control systems magnetic head K can be maintained in the correct position on the track.

However, it has been found that when digital information is read the accuracy of this tracking control may be unsatisfactory. This is because the digital information signal may contain frequency components which lie within the bandwidth of the tracking signals. To illustrate this FIG. 2 shows the frequency spectrum of a digital information signal which is designated by the letter I. Generally, the code for the digital information signal is selected so as to minimize d.c. components in this signal. Moreover, this ensures that the low-frequency signal content of this digital signal is comparatively small. However, as can be seen in FIG. 2, the digital information signal I may comprise components within the bandwidth of the tracking signals S. If the tracking signals S are extracted from the signal that is read in the customary manner, for example by means of a low-pass or a band-pass filter, it will be evident that this extracted signal may still contain signal components of the digital information signal. It is obvious that these components may disturb the generated error signal, so that the tracking of head K relative to the desired track is no longer optimal, which has an adverse effect on the read process. This effect will be even more pronounced when a channel code with a fairly high d.c. content (designated by the dash-dot I' line) is used, which may be desirable for specific uses, inter alia because of the frequency bandwidth.

FIG. 3 shows an embodiment of the apparatus in accordance with the invention. The signal which is read by the read element, in the present case the magnetic head K, is applied to an amplifier 1. Firstly the amplified signal is applied to a signal processing circuit 2 which regenerates the digital information signal from the signal being read. For this purpose this signal processing circuit, in addition to a frequency correction network 3, comprises a detector 4 on whose output the original digital information signal is available. As this detector 4 is controlled by a clock signal which is derived from the information signal by means of a phase-locked loop 6 it is ensured that the output signal of this detector represents the original digital information signal with a high accuracy. This digital information signal is then applied to a demodulator 5, in which decoding is effected, after which this signal is available for further processing on an output terminal 7.

The digital information signal on the output of the detector 4 is also applied to a correction circuit 14, which correction circuit has a transfer characteristic which at least within the frequency band of the tracking signals corresponds to the transfer characteristic of the chain comprising the recording element, the record carrier and the read element. Since for magnetic record carriers the characteristics of the recording head and of the record carrier are substantially straight within this range the correction circuit 14 may have a characteristic which corresponds to that of the magnetic head K. Since the characteristic of such a magnetic read head corresponds to that of a differentiating network a correction circuit having a differentiating character may be used. Consequently, this correction circuit 14 supplies an output signal which at least within the frequency band of the tracking signals corresponds to the signal content of the digital information signal within this frequency band. This output signal is applied to a compensation circuit 10 in the servo control system 8. This servo control system is also coupled to the output of the amplifier 1 and therefore receives the signal read from this amplifier. In the compensation circuit the output signal of the correction circuit 14 is subtracted from the signal that is read as produced at the output of amplifier 1. The difference signal supplied by this compensation circuit 10 comprises only the tracking signals S, because cross-talk components of the digital information signal within the frequency band of these tracking signals are completely eliminated by this process. By way of a filter 11, for example a band-pass or a low-frequency filter, these tracking signals are transferred to a signal processing unit 12, which derives the desired error signal from these tracking signals, which error signal is supplied to an output terminal 13 for further processing. In the servo control system 8 a delay circuit 9 is arranged before the compensation circuit 10, which delay circuit introduces a time delay equal to the overall time delay caused by the frequency correction network 3, the detector 4, and the correction circuit 14.

It will be evident that the invention is not limited to the embodiment described. For example, the invention is not limited to the use of tracking signals of four different frequencies, as is indicated in FIG. 1, but may be used in any read apparatus in which an error signal, which is a measure of the deviation of the read element relative to the information track, is generated by means of tracking signals of comparatively long wavelengths recorded in the information tracks. The manner in which this error signal is employed for controlling the position of the read element relative to the information track is of subordinate importance to the present invention. Furthermore, the invention is not limited to apparatus for reading magnetic record carriers but may equally be employed with record carriers which are for example read optically or capacitively.

What is claimed is:

1. An apparatus for reading a record carrier which comprises information tracks which in addition to an information signal also contain tracking signals, which apparatus comprises a read element for reading the information recorded in the information tracks, a signal-processing circuit for processing the information signal present in the information that is read and a servo control system for deriving an error signal fron the tracking signals extracted from the information that is read, which error signal is representative of the position of the read element relative to the information track that is being read in a direction transverse to the track direction and tfor controlling the position of said read element relative to said information track in response to said error signal, characterized in that for reading a record carrier on which a digital information signal has been recorded the signal processing circuit is adapted to regenerate said digital information signal, the apparatus further comprises a correction circuit, which is coupled to said signal processing circuit, for receiving the regenerated digital information signal, and the servo control system comprises a compensation circuit, which is coupled to the output of the correction circuit, for reducing cross-talk components of the digital information signal in the tracking signals, said correction circuit having a transfer characteristic which at least within the frequency band of the tracking signals at least approximates the transfer characteristic of the chain comprising the recording element used for recording the information, the record carrier and the read element.

2. An apparatus as claimed in claim 1, for reading a magnetic record carrier, characterized in that the correction circuit has a transfer characteristic which at least substantially corresponds to the transfer characteristic of the read element.

3. An apparatus as claimed in claim 2, characterized in that the correction circuit comprises a differentiator.

* * * * *